United States Patent
Chen et al.

(10) Patent No.: US 12,497,300 B2
(45) Date of Patent: Dec. 16, 2025

(54) ARTIFICIAL TANZANITE AND ITS MANUFACTURING METHOD

(71) Applicant: NATIONAL CHENG KUNG UNIVERSITY, Tainan (TW)

(72) Inventors: Yen-Hua Chen, Tainan (TW); Jia-Cheng Ni, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 538 days.

(21) Appl. No.: 17/985,282

(22) Filed: Nov. 11, 2022

(65) Prior Publication Data

US 2024/0158243 A1 May 16, 2024

(51) Int. Cl.
 *C01B 33/26* (2006.01)
 *C01F 11/00* (2006.01)
 *C01G 11/00* (2006.01)
 *C01G 31/02* (2006.01)

(52) U.S. Cl.
 CPC .......... *C01B 33/26* (2013.01); *C01F 11/00* (2013.01); *C01G 31/02* (2013.01)

(58) Field of Classification Search
 CPC .......... C01B 33/26; C01F 11/00; C01G 31/02
 USPC ...................................... 423/328.1
 See application file for complete search history.

(56) References Cited

U.S. PATENT DOCUMENTS

| | | | | |
|---|---|---|---|---|
| 4,257,874 A * | 3/1981 | Bergna | ..................... | B01J 35/60 208/111.1 |
| 4,272,409 A * | 6/1981 | Bergna | ................... | B01J 37/024 502/64 |
| 4,339,421 A * | 7/1982 | Schultess | ............... | A61K 33/06 424/688 |
| 4,745,092 A * | 5/1988 | Prunier, Jr. | ........... | C04B 35/195 501/153 |
| 6,489,264 B1 * | 12/2002 | Isupova | ................... | B01J 23/78 502/313 |
| 11,300,029 B2 * | 4/2022 | Malmberg | ......... | B01D 53/9418 |
| 11,865,527 B2 * | 1/2024 | Zhang | .................... | B01J 29/703 |

FOREIGN PATENT DOCUMENTS

JP S59141485 A 8/1984

* cited by examiner

*Primary Examiner* — Cam N. Nguyen
(74) *Attorney, Agent, or Firm* — Troutman Pepper Locke LLP; Tim Tingkang Xia, Esq.

(57) ABSTRACT

An artificial tanzanite comprises aluminosilicate and vanadium, wherein the content of the aluminosilicate is in a range from 1 mass % to 30 mass % and the content of the vanadium is in a range from 1000 ppm to 40000 ppm. The artificial tanzanite is prepared by a method comprising: providing a synthetic raw material, wherein the synthetic raw material comprises the aluminosilicate, silicon-containing oxide, vanadium-containing oxide, and calcium-containing salt; and heating the synthetic raw material to a synthetic temperature, and keeping the synthetic raw material under a synthetic pressure to carry out synthetic reaction to form the artificial tanzanite after a period of synthetic time.

11 Claims, 4 Drawing Sheets

ARTIFICIAL TANZANITE AND ITS MANUFACTURING METHOD

FIELD OF THE INVENTION

The present invention relates to a manufacturing method of an artificial tanzanite, and particularly relates to a manufacturing method for artificially synthesizing tanzanite in a low-cost manner.

BACKGROUND OF THE INVENTION

Tanzanite, also known as blue zoisite, is usually a blue or blue-purple pleochroic gemstone, which is recognized as a gem similar to the sapphire in the world. In 1967, tanzanite was first discovered in the Merelani mine in Tanzania, East Africa, and then American jeweler Tiffany & Co. named it Tanzanite. In the 1980s, with the release of the movie "Titanic", the tanzanite "Heart of the Ocean" necklace worn by the heroine attracted public attention, and tanzanite became a popular gemstone in the United States. In addition to Turquoise and Zircon, the American Gem Trade Association (AGTA) has officially listed Tanzanite as one of December's birthstones.

In terms of color and luster, no matter which color of tanzanite, the richer the color of tanzanite is, the higher the grade of tanzanite is, and the tanzanite with indigo blue color similar to sapphire is more valuable than the tanzanite with blue-purple color. The top-grade tanzanite and A-grade tanzanite are mainly indigo blue, and have a variety of luster at different angles; B-grade tanzanite has less luster and the color of it has a little dark purple; C-grade tanzanite is lighter purple in color. Like other gemstones, the larger the carat of tanzanite is, the higher the price of tanzanite is. If you want to have the purer indigo blue tanzanite, you usually have to cut it into smaller pieces. Therefore, most of the large-carat tanzanites in the market are purple, and the pure blue tanzanites are usually rare and small. The preciousness of the value of tanzanite also lies in the place of origin because the place of origin is relatively rare. More than 90% of the mining areas are controlled by Tiffany & Co., so it is relatively rare in the market. Therefore, in general, the probability of encountering more than 3~5 carats is not high, and the price of tanzanite is of course high. To make matters worse, according to relevant data reports, Tanzania, the origin of natural tanzanite, will make mines closure in 2025.

Because the price of natural tanzanite is not easy to approach, and people's favorite indigo tanzanite is restricted by the conditions of natural tanzanite itself. The size of natural tanzanite is generally very small and cannot meet people's needs. Therefore, seeking a low-cost and man-made method for synthesizing tanzanite with controlled particle size and color has become a common concern of the industry and academia. For example, a synthetic method of artificial zoisite single crystal is mentioned in Japanese Patent Application Laid-Open Publication No. S59-141485 (JP S59141485), and tanzanite is a variant of zoisite. This Japanese patent teaches the use of aluminum hydroxide, calcium oxide, aluminum oxide, silicon dioxide, lithium molybdate, molybdenum trioxide, lithium hydroxide and vanadium pentoxide can be synthesized by molten salt method in the temperature range of 700° C.-1,100° C. However, this method still needs to increase the synthetic temperature to above 700° C. or even more than 1,000° C., and the market value of the synthesized zoisite is not as high as that of tanzanite, so it is not in line with economic benefits in actual operation.

SUMMARY OF THE INVENTION

Therefore, regarding the aforementioned problem to be solved, the present invention will disclose to prepare tanzanite in a manual control manner, which can not only effectively reduce the price of tanzanite, but also freely control the output and size of artificial tanzanite, and overcome the aforementioned issues of common concern in industry and academia.

Therefore, an object of the present invention is to provide an artificial tanzanite whose composition comprises aluminosilicate, calcium, aluminum, silicon and vanadium, wherein the content of the aluminosilicate is in a range from 1 mass % to 30 mass %, the content of the vanadium is in a range from 1,000 ppm to 40,000 ppm.

In the artificial tanzanite as described above, the artificial tanzanite is prepared by a method comprising: step S1: providing a synthetic raw material, wherein the synthetic raw material comprises aluminosilicate, silicon-containing oxide, vanadium-containing oxide, and calcium-containing salt; and step S2: heating the synthetic raw material to a synthetic temperature, and keeping the synthetic raw material under a synthetic pressure to carry out synthetic reaction to form the artificial tanzanite after a period of synthetic time.

In the artificial tanzanite as described above, the synthetic raw material further comprises an organic acid for mixing the aluminosilicate, the silicon-containing oxide, the vanadium-containing oxide and the calcium-containing salt to make the synthetic raw material in an acidic state.

In the artificial tanzanite as described above, the organic acid is selected from the group consisting of aconitic acid, glyceric acid, malic acid, tartaric acid, glycolic acid, 1,2,3,4-butanetetracarboxylic acid, tricarballylic acid, malonic acid, propionic acid, acrylic acid, oxalic acid, lactic acid, citric acid, acetic acid, thioglycolic acid, ethylenediaminetetraacetic acid, iminodiacetic acid, formic acid, phthalic acid, butyric acid, maleic acid, isocitric acid, gluconic acid, adipic acid, glutamic acid, p-toluenesulfonic acid, methanesulfonic acid and benzenesulfonic acid.

In the artificial tanzanite as described above, the calcium-containing salt is selected from the group consisting of calcium oxalate, calcium gluconate, calcium lactate, calcium acetate, calcium chlorate, calcium carbonate, calcium phosphate, calcium hydrogen phosphate, calcium sulfite, calcium sulfate, calcium nitrate, calcium oxide, calcium chloride, calcium bromide, calcium iodide, calcium fluoride, calcium hydroxide and calcium iodate.

In the artificial tanzanite as described above, the aluminosilicate is selected from the group consisting of kyanite, andalusite and sillimanite, the silicon-containing oxide is selected from the group consisting of silica, sand, mullite, quartz and glass, and the vanadium-containing oxide is selected from the group consisting of vanadium monoxide, vanadium dioxide, vanadium trioxide, vanadium tetroxide and vanadium pentoxide.

In the artificial tanzanite as described above, the synthetic temperature is in a range from 160° C. to 430° C.

In the artificial tanzanite as described above, the synthetic pressure is in a range from 50 atm to 100 atm.

In the artificial tanzanite as described above, the pH of the organic acid is less than 4.

In the artificial tanzanite as described above, the calcium-containing salt is a calcium-containing hydroxide, the synthetic temperature is in a range from 500° C. to 700° C., and the synthetic pressure is in a range from 1.2 GPa to 1.7 GPa.

Another object of the present invention is to provide a method for manufacturing the artificial tanzanite comprising: step S1: providing a synthetic raw material, wherein the synthetic raw material comprises aluminosilicate, silicon-containing oxide, vanadium-containing oxide, and calcium-containing salt; and step S2: heating the synthetic raw material to a synthetic temperature, and keeping the synthetic raw material under a synthetic pressure to carry out synthetic reaction to form the artificial tanzanite after a period of synthetic time.

In the method as described above, the synthetic raw material further comprises an organic acid for mixing the aluminosilicate, the silicon-containing oxide, the vanadium-containing oxide and the calcium-containing salt to make the synthetic raw material in an acidic state.

In the method as described above, the organic acid is selected from the group consisting of aconitic acid, glyceric acid, malic acid, tartaric acid, glycolic acid, 1,2,3,4-butanetetracarboxylic acid, tricarballylic acid, malonic acid, propionic acid, acrylic acid, oxalic acid, lactic acid, citric acid, acetic acid, thioglycolic acid, ethylenediaminetetraacetic acid, iminodiacetic acid, formic acid, phthalic acid, butyric acid, maleic acid, isocitric acid, gluconic acid, adipic acid, glutamic acid, p-toluenesulfonic acid, methanesulfonic acid and benzenesulfonic acid.

In the method as described above, the calcium-containing salt is selected from the group consisting of calcium oxalate, calcium gluconate, calcium lactate, calcium acetate, calcium chlorate, calcium carbonate, calcium phosphate, calcium hydrogen phosphate, calcium sulfite, calcium sulfate, calcium nitrate, calcium oxide, calcium chloride, calcium bromide, calcium iodide, calcium fluoride, calcium hydroxide and calcium iodate.

In the method as described above, the aluminosilicate is selected from the group consisting of kyanite, andalusite and sillimanite, the silicon-containing oxide is selected from the group consisting of silica, sand, mullite, quartz and glass, and the vanadium-containing oxide is selected from the group consisting of vanadium monoxide, vanadium dioxide, vanadium trioxide, vanadium tetroxide and vanadium pentoxide.

In the method as described above, the synthetic temperature is in a range from 160° C. to 430° C.

In the method as described above, the synthetic pressure is in a range from 50 atm to 100 atm.

In the method as described above, the pH of the organic acid is less than 4.

In the method as described above, the calcium-containing salt is a calcium-containing hydroxide, the synthetic temperature is in a range from 500° C. to 700° C., and the synthetic pressure is in a range from 1.2 GPa to 1.7 GPa.

According to the manufacturing method provided by the present invention, the artificial tanzanite has the following advantages:
1. The method for manufacturing the artificial tanzanite by the present invention includes a solvothermal synthesis method, which utilizes low cost to obtain synthetic raw materials and the selection of special solvents, so that low-cost artificial tanzanite can be prepared at a lower synthetic temperature.
2. The artificial tanzanite manufactured by the present invention can be prepared by artificial preparation of synthetic raw materials in the process conditions so as to control the content of vanadium in a range from 1,000 ppm and 40,000 ppm and the content of aluminosilicate within 1 mass % to 30 mass %, thereby making the artificial tanzanite exhibit different color effects.
3. The size of the artificial tanzanite prepared by the present invention can be controlled by the synthetic time in the process conditions so that the size of the artificial tanzanite can be grown to the actual required size.
4. The manufacturing process of the artificial tanzanite prepared by the present invention utilizes low-cost synthetic raw materials, and the mass production cost of the manufacturing process for synthesizing the artificial tanzanite is low. The size of the container for the synthetic reaction can be designed to improve the output of the artificial tanzanite, and it takes the low cost energy consumption. Therefore, the manufacturing cost can be effectively reduced, and thus the economic benefits can be met.

DETAILED DESCRIPTION OF THE INVENTION

Figure 1:
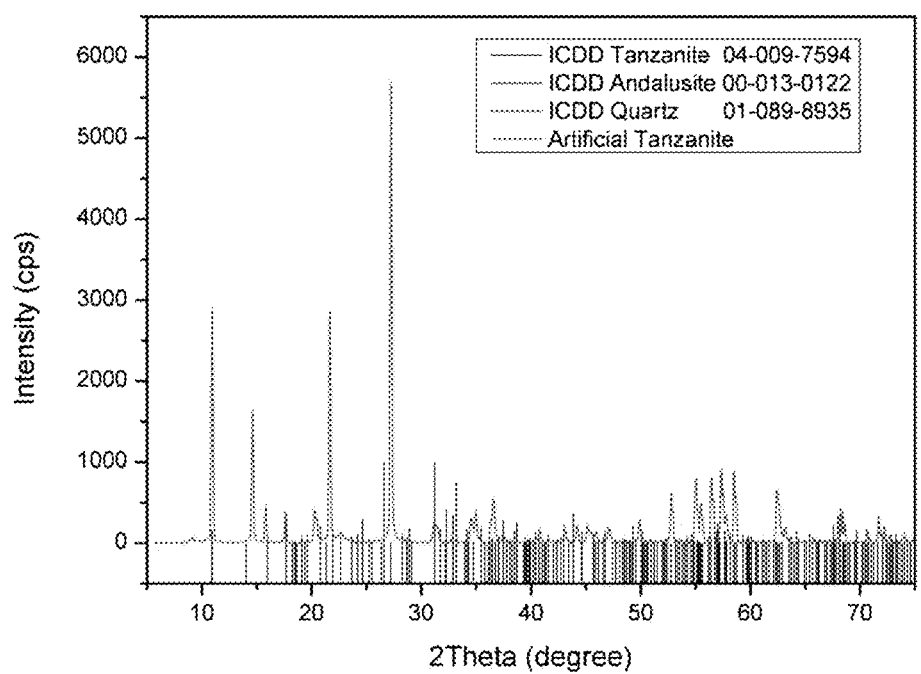
FIG. 1 is a XRD pattern of an artificial tanzanite of the present invention.
Figure 2:
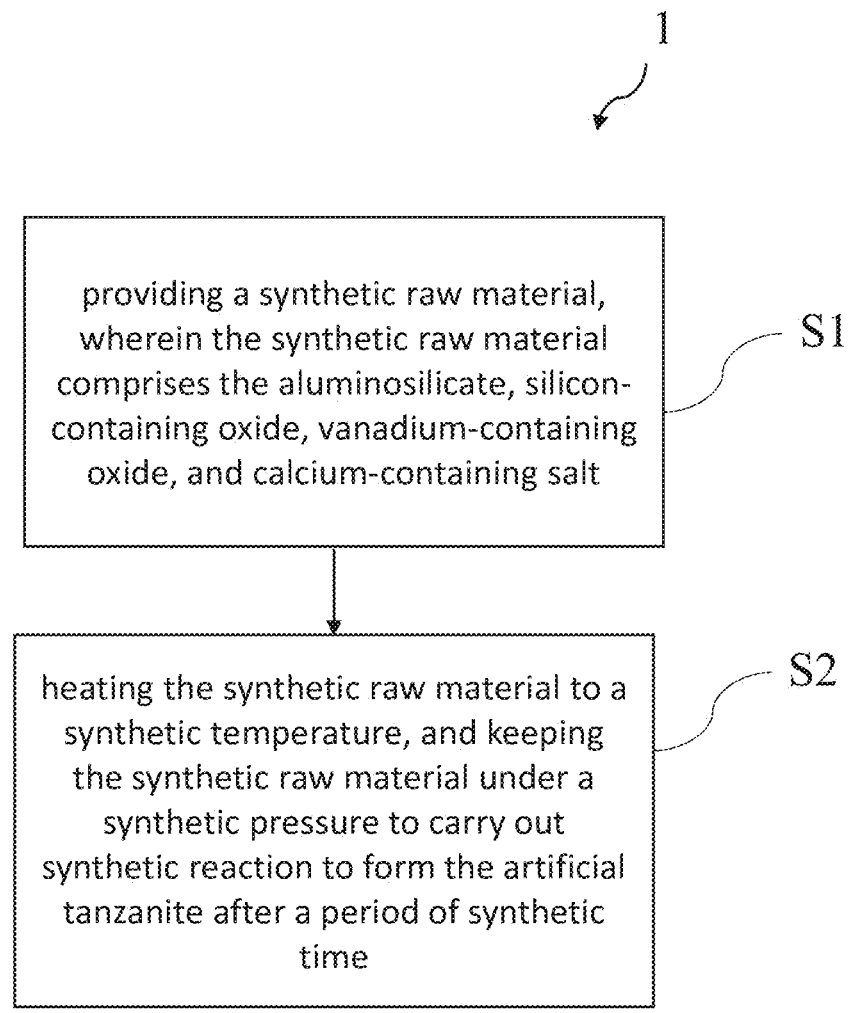
FIG. 2 is a schematic flow chart of a method for manufacturing an artificial tanzanite of the present invention.

One embodiment of the present invention provides an artificial tanzanite, its composition comprises aluminosilicate, calcium, aluminum, silicon and vanadium, wherein the content of the aluminosilicate is in a range from 1 mass % to 30 mass %, and the content of the vanadium is in a range from 1,000 ppm to 40,000 ppm. Due to the artificial synthetic method, some aluminosilicates will remain in the synthetic artificial tanzanite composition, as shown in FIG. 1. As for the design of the upper and lower limits of the vanadium content, the reason is that when the vanadium content is greater than 40,000 ppm, it will exceed the upper limit of the saturated concentration of tanzanite, and when the vanadium content is less than 1,000 ppm, it will overlap with the vanadium content of ordinary natural tanzanite. Therefore, in order to highlight the difference and application range between the artificial tanzanite of the present invention and the natural tanzanite, the content of vanadium is designed to be in a range from 1,000 ppm to 40,000 ppm. In some embodiments, the vanadium content of the artificial tanzanite may be in a range from 5,500 ppm to 40,000 ppm, in a range from 10,000 ppm to 40,000 ppm, in a range from 15,000 ppm to 40,000 ppm, in a range from 8,000 ppm to 35,000 ppm, or in a range from 10,000 ppm to 35,000 ppm, so as to achieve different color rendering effects. The present invention can precisely control the content of vanadium in the tanzanite by artificial adjustment of synthetic raw materials and synthetic conditions, and can be set between different ranges of ppm according to actual needs so as to achieve the show effect of different colors that meet the needs of consumers. Therefore, the manufacturing method of this artificial tanzanite is described in detail as follows.

One embodiment of the present invention is to provide a manufacturing method 1 of the artificial tanzanite, please refer to FIG. 1, which comprises: Step S1: providing a synthetic raw material, wherein the synthetic raw material comprises aluminosilicate, silicon-containing oxide, vanadium-containing oxide and calcium-containing salt; and Step S2: heating the synthetic raw material to a synthetic temperature, and keeping the synthetic raw material under a synthetic pressure to carry out synthetic reaction to form the artificial tanzanite after a period of synthetic time.

In some embodiments, the manufacturing method 1 of this artificial tanzanite adopts a solvothermal synthesis method, which utilizes low cost to obtain synthetic raw materials and the selection of special solvents, so that low-cost artificial tanzanite can be prepared at a lower synthetic temperature. Therefore, in step S1, when the synthetic raw material is used with the solvothermal synthesis method to synthesize artificial tanzanite, the synthetic raw material further comprises an organic acid for mixing the aluminosilicate, the silicon-containing oxide, the vanadium-containing oxide and the calcium-containing salt to make the synthetic raw material be in an acidic state, wherein the organic acid is selected from the group consisting of aconitic acid, glyceric acid, malic acid, tartaric acid, glycolic acid, 1,2,3,4-butanetetracarboxylic acid, tricarballylic acid, malonic acid, propionic acid, acrylic acid, oxalic acid, lactic acid, citric acid, acetic acid, thioglycolic acid, ethylenediaminetetraacetic acid, iminodiacetic acid, formic acid, phthalic acid, butyric acid, maleic acid, isocitric acid, gluconic acid, adipic acid, glutamic acid, p-toluenesulfonic acid, methanesulfonic acid and benzenesulfonic acid, and the pH of the organic acid is less than 4. The aluminosilicate is selected from the group consisting of kyanite, andalusite and sillimanite. The silicon-containing oxide is selected from the group consisting of silica, sand, mullite, quartz and glass. The vanadium-containing oxide is selected from the group consisting of vanadium monoxide, vanadium dioxide, vanadium trioxide, vanadium tetroxide and vanadium pentoxide. The calcium-containing salt is selected from the group consisting of calcium oxalate, calcium gluconate, calcium lactate, calcium acetate, calcium chlorate, calcium carbonate, calcium phosphate, calcium hydrogen phosphate, calcium sulfite, calcium sulfate, calcium nitrate, calcium oxide, calcium chloride, calcium bromide, calcium iodide, calcium fluoride, calcium hydroxide and calcium iodate.

It is understood that aluminosilicate, silicon-containing oxide, vanadium-containing oxide and calcium-containing salt in the synthetic raw materials are all common minerals. The solvent organic acid itself can be decomposed to generate sufficient reaction pressure so that the synthesis does not need to rely on an external high-pressure gas cylinder, thereby effectively saving costs and improving safety. In addition, organic acids are soluble and can dissolve synthetic raw materials to generate pentavalent and tetravalent vanadium ions, and these vanadium ions are more likely to participate in the mixing reaction due to the lower energy barrier to be broken through. Furthermore, the organic acid also has reducing properties, which can reduce the pentavalent vanadium to the tetravalent vanadium, so that the artificial tanzanite exhibits pleochroism.

It is worth mentioning that, when the pH value of this organic acid is not less than 4, the effect of the synthetic reaction is not good because the dissociation rate of the acid is not enough. Therefore, the pH value of the organic acid must be maintained to be less than 4 in order to achieve better responsive results. In the present embodiment, the method of using organic acid is also due to the high acid dissociation rate of organic acid, which can keep the pH value less than 4, so it meets the requirements of the present invention. In some embodiments, the pH may be in a range from 1 to 3 or in a range from 0.5 to 3.5.

Specifically, the present invention can use the hydrothermal autoclave as the reaction apparatus of the synthetic reaction, and it can control the synthetic temperature in a range from 160° C. to 430° C., the synthetic pressure in a range from 50 atm to 100 atm, and the synthetic time is about 6 hours to 1 month. The temperature and pressure conditions are relatively easy to achieve, so the cost of the process is low. It is understandable that the length of the synthetic time depends on the size of the artificial tanzanite required to grow. Of course, the larger the artificial tanzanite becomes, the longer the synthetic time is required. As for the upper and lower limits of the synthetic temperature and synthetic pressure, they are designed and determined according to the phase diagram of the raw materials. When the synthetic temperature is higher than 430° C., it is prone to dehydration of artificial tanzanite. When the synthetic temperature is lower than 160° C., the reaction could not be successful. The synthetic pressure is designed to determine the upper and lower limit values in a similar way. In some embodiments, this synthetic temperature can be controlled in the range from 160° C. to 400° C., from 200° C. to 380° C. or from 250° C. to 350° C., and the synthetic pressure can be controlled in the range from 50 atm to 90 atm, from 60 atm to 80 atm or from 70 atm to 90 atm.

Specifically, the required process conditions and results of the solvothermal synthesis method of the present invention are shown in Table 1 below. Under the conditions of less than 160° C. and 50 atm, the artificial tanzanite cannot be synthesized.

TABLE 1

| Synthetic condition | acidic condition | synthetic temperature | synthetic pressure | synthetic result |
|---|---|---|---|---|
| Condition 1 | organic acid | less than 160° C. | less than 50 atm | artificial tanzanite cannot be synthesized |
| Condition 2 | organic acid | between 160° C. and 430° C. | between 50 atm and 100 atm | artificial tanzanite can be synthesized |
| Condition 3 | organic acid | more than 430° C. | more than 100 atm | artificial tanzanite cannot be synthesized |
| Condition 4 | inorganic acid | less than 160° C. | less than 50 atm | artificial tanzanite cannot be synthesized |
| Condition 5 | inorganic acid | between 160° C. and 430° C. | between 50 atm and 100 atm | artificial tanzanite cannot be synthesized |
| Condition 6 | inorganic acid | more than 430° C. | more than 100 atm | artificial tanzanite cannot be synthesized |

In other embodiments, the manufacture method 1 of this artificial tanzanite can adopt solid phase synthesis method. Therefore, in step S1, when the synthetic raw material is a calcium-containing hydroxide among calcium-containing salt, an organic acid does not need to be used in the synthetic raw material. At this time, since all the raw materials are in the solid phase, the whole reaction is a solid phase reaction. Therefore, the synthetic temperature ranges from 500° C. to 700° C., the synthetic pressure ranges from 1.2 GPa to 1.7 GPa, and the synthetic time takes about 6 hours to 1 month. It is understandable that the length of the synthetic time depends on the size of the artificial tanzanite required to grow. Of course, the larger the artificial tanzanite becomes, the longer the synthetic time is required. As for the upper and lower limits of the synthetic temperature and synthetic pressure, they are designed and determined according to the phase diagram of the raw materials. In some embodiments, this synthetic temperature can be controlled in the range from 550° C. to 650° C., from 580° C. to 680° C. or from 530° C. to 630° C., and the synthetic pressure can be controlled in the range from 1.3 GPa to 1.6 GPa, from 1.4 GPa to 1.5 GPa or from 1.35 GPa to 1.65 GPa.

It is worth mentioning that, since 1 billion Pascals (GPa) equals to 9869.23 standard atmospheric pressure (atm), the process equipment and process conditions, such as 1.2 GPa to 1.7 GPa, required by the solid-phase synthesis method compared with the process equipment and process conditions of the solvothermal synthesis method are more expensive and difficult. Therefore, the present invention adopts the solvothermal synthesis method that the reaction conditions not only are easier to achieve, but also the reaction temperature and pressure conditions are relatively low, and the reaction can be carried out for a long time. The hydrothermal autoclave has high safety, low solvent toxicity and is easy to obtain, so its industrial practicability is better. Due to the crystal growth environment that can be achieved by the solvothermal synthesis method, the stretching reaction time is about 24-168 hours, and the average particle size of artificial tanzanite can be grown from 10 μm to 0.6 mm. In addition, the solvothermal synthesis method is easy to mass-produce, close to the natural environment, with low energy consumption, and can increase the total amount of products according to the size of the reaction vessel. Therefore, the synthetic cost of the solvothermal synthesis method of the present invention is relatively low, both in terms of raw material cost and energy consumption cost, but its yield is relatively high. About 5.56 grams of tanzanite can be produced with NT$113.56, and its maximum particle size is 0.6 mm, which can be used as epitaxial seeds. The unit price of one carat (0.2 g) tanzanite sold in the market is 650-900 US dollars, so the manufacturing method of the artificial tanzanite of the present invention is very competitive in the market.

Figure 3:
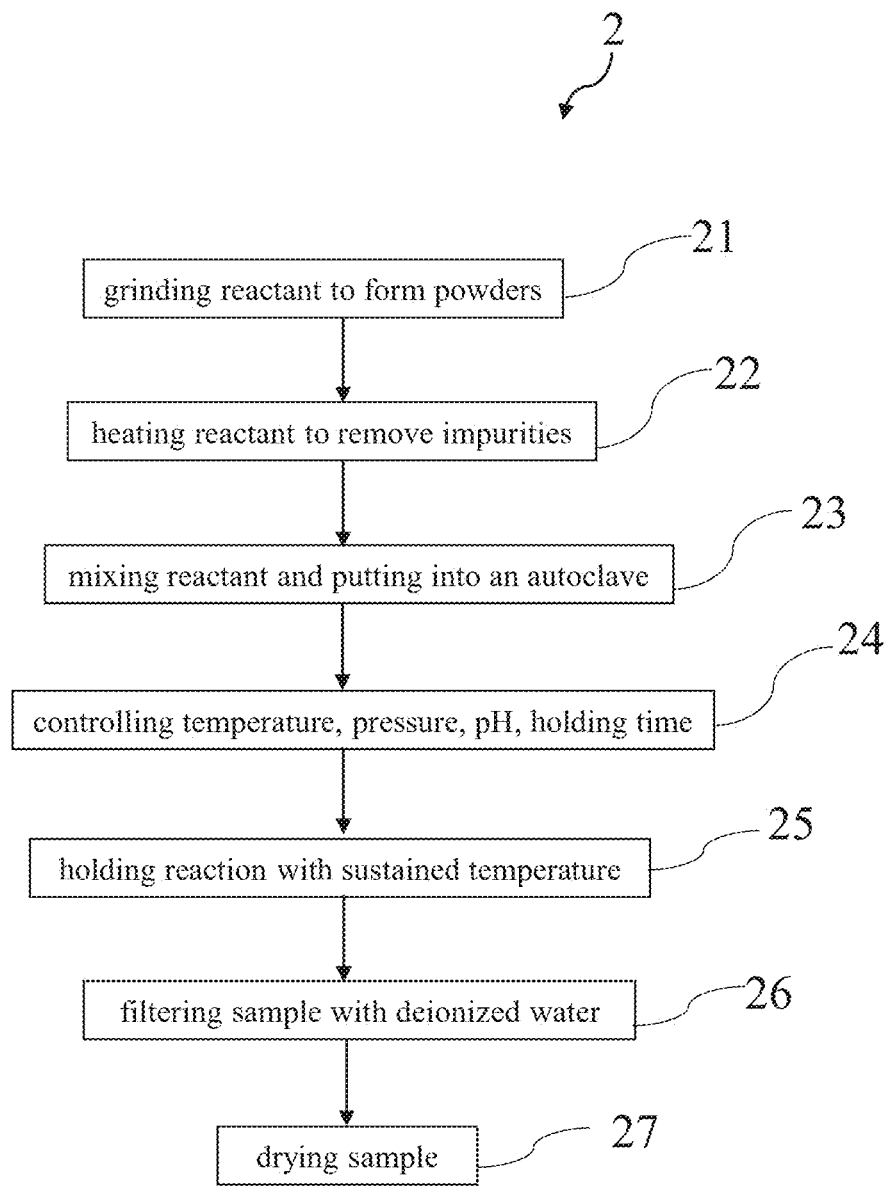
FIG. 3 is a schematic flow chart of the first manufacturing method for an artificial tanzanite of the present invention.
Figure 4:
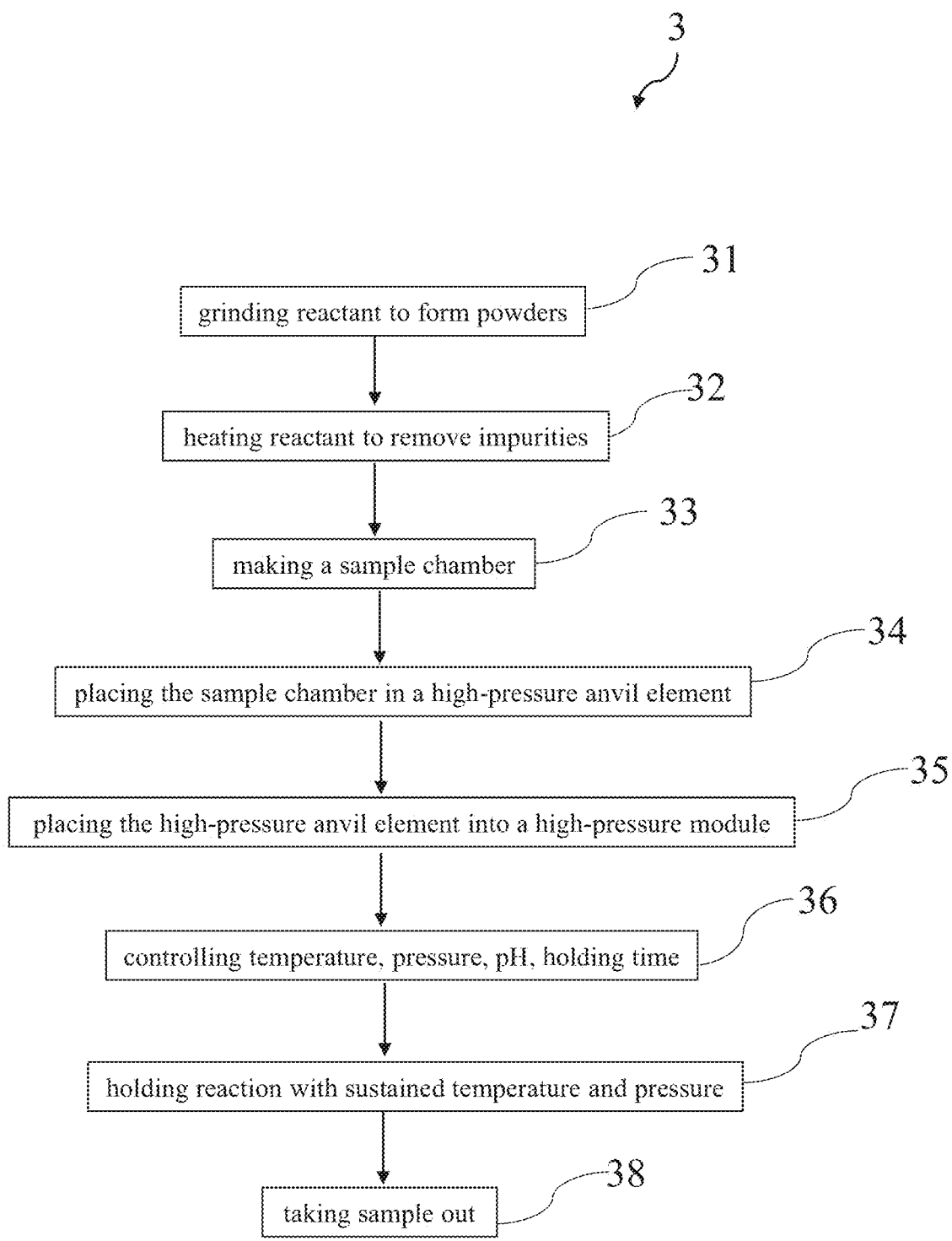
FIG. 4 is a schematic flow chart of the second manufacturing method for an artificial tanzanite of the present invention.

Specifically, the present invention can utilize an autoclave or a high-pressure anvil element to provide the desired synthetic pressure. Please refer to FIG. 3, it is a first process method 2 for manufacturing artificial tanzanite by using an autoclave, which comprises grinding reactant to form powders 21, heating reactant to remove impurities 22, mixing reactant and putting into an autoclave 23, controlling temperature, pressure, pH, holding time 24, holding reaction with sustained temperature 25, filtering sample with deionized water 26 and drying sample 27. Please refer to FIG. 4, another embodiment is a second process method 3 for manufacturing artificial tanzanite by using a high-pressure anvil element. It comprises grinding reactant to form powders 31, heating reactant to remove impurities 32, making a sample chamber 33, placing the sample chamber in a high-pressure anvil element 34, placing the high-pressure anvil element into a high-pressure module 35, controlling temperature, pressure, pH, holding time 36, holding reaction with sustained temperature and pressure 37 and taking sample out 38, wherein in the step of making the sample chamber 33, the parts of the sample chamber sequentially include pressure transmission medium, ceramic sleeve, resistance heating tubes and samples from outside to inside, so as to achieve better preparation results.

According to the manufacturing method provided by the present invention, the artificial tanzanite has the following advantages:

1. The method for manufacturing the artificial tanzanite by the present invention includes a solvothermal synthesis method, which utilizes low cost to obtain synthetic raw materials and the selection of special solvents, so that low-cost artificial tanzanite can be prepared at a lower synthetic temperature.
2. The artificial tanzanite manufactured by the present invention can be prepared by artificial preparation of synthetic raw materials in the process conditions so as to control the content of vanadium in a range from 1,000 ppm to 40,000 ppm and the content of aluminosilicate within 1 mass % to 30 mass %, thereby making the artificial tanzanite exhibit different color effects.
3. The size of the artificial tanzanite prepared by the present invention can be controlled by the synthetic time in the process conditions so that the size of the artificial tanzanite can be grown to the actual required size.
4. The manufacturing process of the artificial tanzanite prepared by the present invention utilizes low-cost synthetic raw materials, and the mass production cost of the manufacturing process for synthesizing the artificial tanzanite is low. The size of the container for the synthetic reaction can be designed to improve the output of the artificial tanzanite, and it takes the low cost energy consumption. Therefore, the manufacturing cost can be effectively reduced, and thus the economic benefits can be met.

In summary, the price of the artificial tanzanite prepared by the present invention is far lower than the natural tanzanite, and the preparation method of the artificial tanzanite of the present invention can effectively control the presentation of the output, size and color of the artificial tanzanite, so it has quite high market application potential and economic value.

It is to be understood that the foregoing descriptions of the embodiments are given by way of example only, and various modifications may be made by those skilled in the art to which this field pertains. The above specification and examples provide a complete description of the flow of exemplary embodiments of the invention and their uses. Although the above embodiments disclose specific embodiments of the present invention, they are not intended to limit the present invention. Those with ordinary knowledge in the technical field to which the present invention pertains, without departing from the principle and spirit of the present invention, can make various changes and modifications to it, so the protection scope of the present invention should be defined by the appended claims.

What is claimed is:

1. An artificial tanzanite comprising aluminosilicate, calcium, aluminum, silicon and vanadium, wherein the content of the aluminosilicate is in a range from 1 mass % to 30 mass %, and the content of the vanadium is in a range from 1,000 ppm to 40,000 ppm.

2. The artificial tanzanite as claimed in claim 1, wherein the artificial tanzanite is prepared by a method comprising:
    step S1: providing a synthetic raw material, wherein the synthetic raw material comprises the aluminosilicate, silicon-containing oxide, vanadium-containing oxide, and calcium-containing salt; and
    step S2: heating the synthetic raw material to a synthetic temperature, and keeping the synthetic raw material under a synthetic pressure to carry out synthetic reaction to form the artificial tanzanite after a period of synthetic time.

3. The artificial tanzanite as claimed in claim 2, wherein the synthetic raw material further comprises an organic acid for mixing the aluminosilicate, the silicon-containing oxide, the vanadium-containing oxide and the calcium-containing salt so as to make the synthetic raw material in an acidic state.

4. The artificial tanzanite as claimed in claim 3, wherein the organic acid is selected from the group consisting of aconitic acid, glyceric acid, malic acid, tartaric acid, glycolic acid, 1,2,3,4-butanetetracarboxylic acid, tricarballylic acid, malonic acid, propionic acid, acrylic acid, oxalic acid, lactic acid, citric acid, acetic acid, thioglycolic acid, ethylenediaminetetraacetic acid, iminodiacetic acid, formic acid, phthalic acid, butyric acid, maleic acid, isocitric acid, gluconic acid, adipic acid, glutamic acid, p-toluenesulfonic acid, methanesulfonic acid and benzenesulfonic acid.

5. The artificial tanzanite as claimed in claim 3, wherein the pH of the organic acid is less than 4.

6. The artificial tanzanite as claimed in claim 2, wherein the calcium-containing salt is selected from the group consisting of calcium oxalate, calcium gluconate, calcium lactate, calcium acetate, calcium chlorate, calcium carbonate, calcium phosphate, calcium hydrogen phosphate, calcium sulfite, calcium sulfate, calcium nitrate, calcium oxide, calcium chloride, calcium bromide, calcium iodide, calcium fluoride, calcium hydroxide and calcium iodate.

7. The artificial tanzanite as claimed in claim 2, wherein the aluminosilicate is selected from the group consisting of kyanite, andalusite and sillimanite, and the silicon-containing oxide is selected from the group consisting of silica, sand, mullite, quartz and glass.

8. The artificial tanzanite as claimed in claim 2, wherein the vanadium-containing oxide is selected from the group consisting of vanadium monoxide, vanadium dioxide, vanadium trioxide, vanadium tetroxide and vanadium pentoxide.

9. The artificial tanzanite as claimed in claim 2, wherein the synthetic temperature is in a range from 160° C. to 430° C.

10. The artificial tanzanite as claimed in claim 2, wherein the synthetic pressure is in a range from 50 atm to 100 atm.

11. The artificial tanzanite as claimed in claim 2, wherein the calcium-containing salt is a calcium-containing hydroxide, the synthetic temperature is in a range from 500° C. to 700° C., and the synthetic pressure is in a range from 1.2 GPa to 1.7 GPa.

* * * * *